Oct. 10, 1967    J. J. RUSSO ETAL    3,346,120
OIL CLEANER
Filed Nov. 16, 1964    2 Sheets-Sheet 1
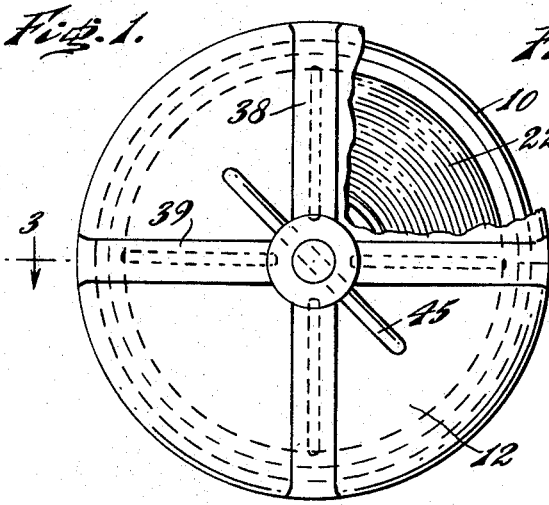
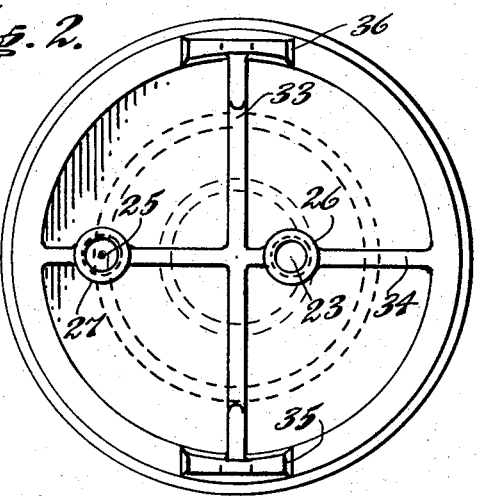
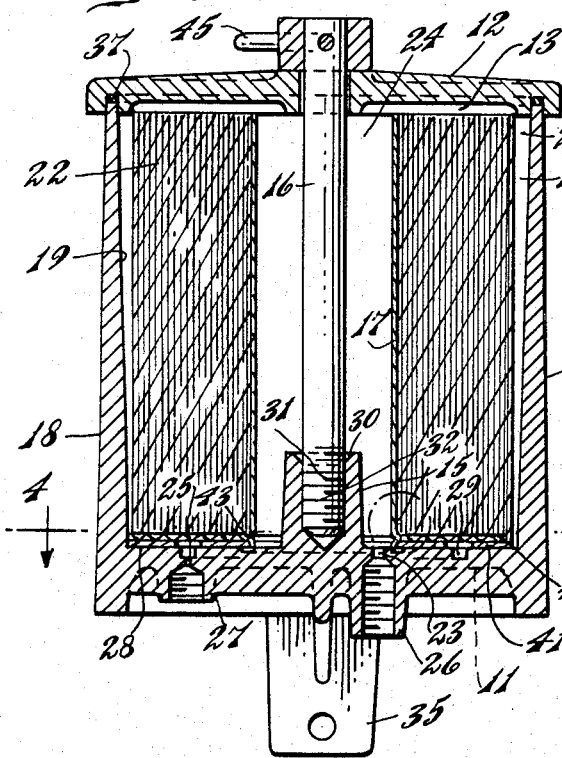
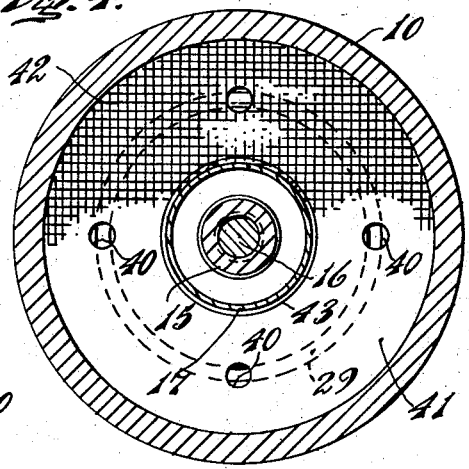
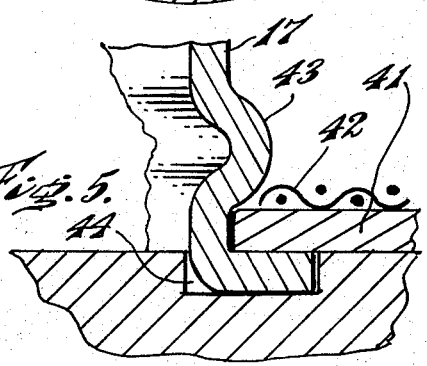
INVENTORS
Michael S. LaMonica, Jr.
Joseph J. Russo
BY
Karl L. Spivak
ATTORNEY

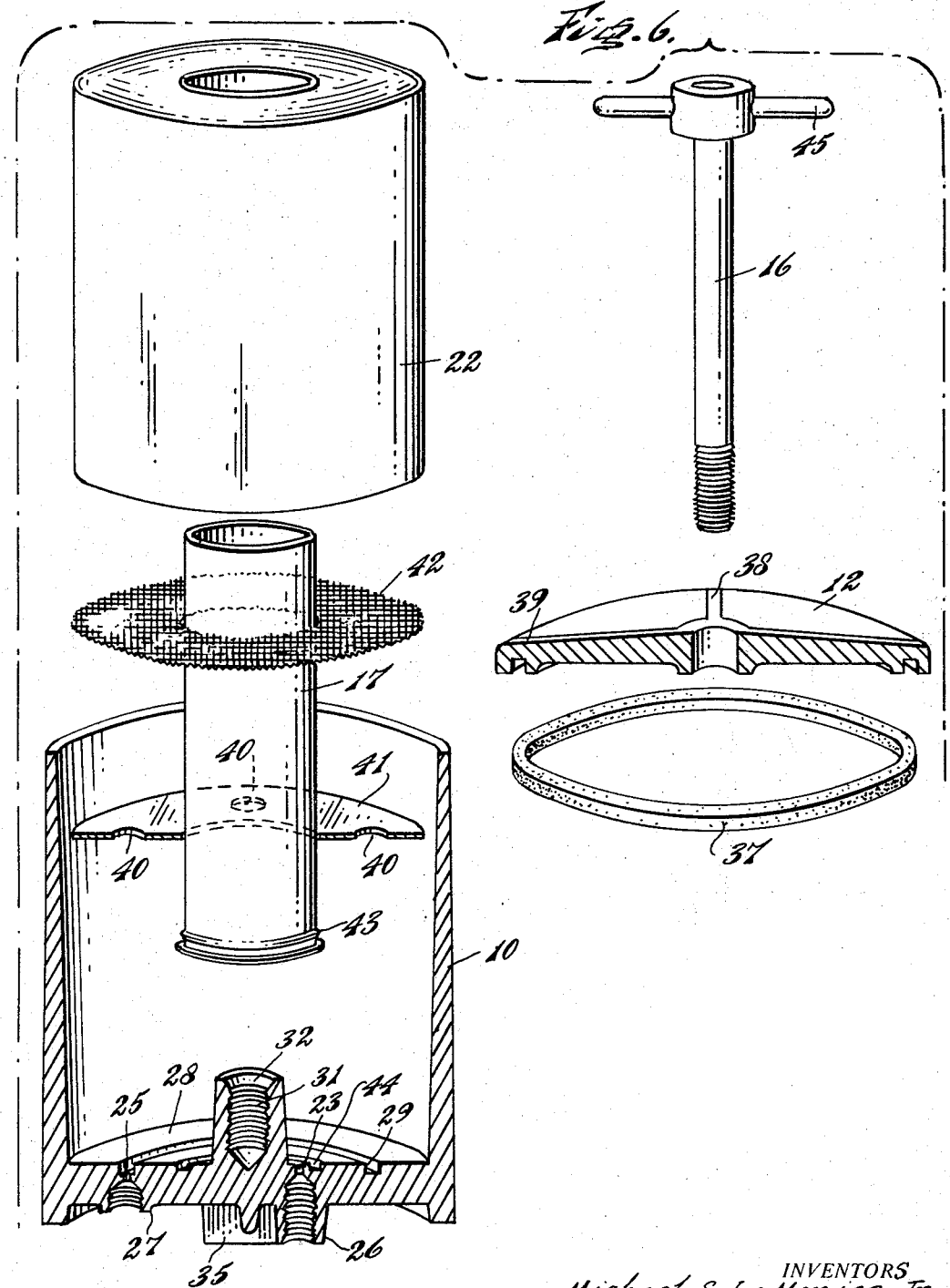

United States Patent Office 3,346,120
Patented Oct. 10, 1967

3,346,120
OIL CLEANER
Joseph J. Russo and Michael S. La Monica, Jr., both of 9191 Torresdale Ave., Philadelphia, Pa. 19114
Filed Nov. 16, 1964, Ser. No. 411,211
3 Claims. (Cl. 210—439)

This invention relates in general to filters and more particularly is directed to improvements in oil filters for internal combustion engines whereby an oil cleaner unit may be easily adapted to operate with readily replaceable, inexpensive filter cartridges.

In general, the invention seeks to provide a novel oil cleaner assembly to be located in conjunction with an automobile engine in a position permitting ready access. The cleaner assembly has been designed to contain an easily replaceable filter unit therein and in the interest of economy in operation, the filter unit chosen may be any commercially available roll of tissue such as toilet tissue or perhaps a roll of absorbent paper towels.

By employing our unique oil cleaner, we have found that the present widely accepted practice of changing the crankcase oil in automobiles and other motor vehicles can be completely abandoned. Rather, inasmuch as oil does not wear out, the same oil may be used over and over again for the life of the engine. The instant invention aids in keeping the oil clean and thus prevents engine wear.

It is therefore an object of this invention to provide an oil cleaner assembly that may be readily connected for use with the engine of the usual passenger automobile.

It is another object of this invention to provide an oil cleaner assembly that may be utilized with an automobile engine that requires no special tools or special knowledge for installation.

It is another object of this invention to provide an oil filter assembly wherein the filtering device is so inexpensively constructed that it may be thrown away and replaced when it has outlived its usefulness.

It is another object of this invention to provide an oil filter assembly including a removable support tube to facilitate replacement of the filter unit.

It is another object of this invention to provide an oil filter assembly incorporating bottom inlet and outlet connections whereby an unencumbered, removable top is provided.

It is another object of this invention to provide an oil filter assembly having simplified construction for mounting in an infinite variety of locations.

It is a further object of this invention to provide an oil filter assembly of extremely simple construction utilizing parts that may be easily and inexpensively manufactured.

It is a further object of this invention to provide an oil filter assembly featuring unique arrangement of interior construction to provide improved oil flow characteristics.

It is a further object of this invention to provide an oil filter assembly that is simple in construction, inexpensive in manufacture and trouble-free in operation.

Other objects and a fuller understanding of the invention will be had by referring to the following description and claims of a preferred embodiment thereof, taken in conjunction with the accompanying drawing wherein like reference characters refer to similar parts throughout the several views and in which:

FIG. 1 is a top plan view of the invention, partly broken away to expose the cleaner element.

FIG. 2 is a bottom plan view of the invention.

FIG. 3 is a cross section taken along line 3—3 of FIG. 1.

FIG. 4 is a cross section taken along line 4—4 of FIG. 3.

FIG. 5 is a detail view enlarged to show connection of support tube to bottom screening.

FIG. 6 is an exploded perspective view showing arrangement and interrelation of the operating parts.

Although specific terms are used in the following description for the sake of clarity, these terms are intended to refer only to the particular structure of our invention selected for illustration in the drawings and are not intended to define or limit the scope of the invention.

Referring now to the drawings, the oil cleaner comprises generally a hollow cylindrical main body 10 having an integral, closed bottom 11. A top 12 seals the open end 13 of the cleaner body 10 and is made readily removable in order to expose the interior 14 of the main body 10. A concentric, interior threaded spindle 15 rises above the bottom 11 to receive top fastening rod 16 while being enclosed by the cleaner cartridge support tube 17.

As seen in FIG. 3, the outer wall 18 of main body 10 is cylindrically formed while inner wall 19 tapers gently to provide a cartridge receiving circular opening 20 adjacent to top 12 having a daimeter slightly greater than that at the cartridge base 21, thereby permitting ready insertion of the oil cleaning cartridge 22. The body bottom 11 is penetrated with an oil inlet orifice 23 immediately adjacent to the spindle 15 to permit the entrance of lubricating oil into the main body interior 14 within a channel 24 enclosed by the support tube 17. A second hole 25 is drilled in bottom 11 to provide an outlet orifice through which the processed oil may leave the oil cleaner body after the impurities (not shown) have been trapped by the filter element 22. Bosses 26, 27 project beneath bottom 11 respectively at oil inlet 23 and oil outlet 25 to permit connection of oil tubing (not shown) in any well-known manner, such as with interior threads 46, 47.

A circular groove 29 which is concentric with spindle 15 is machined into interior surface 28 of the bottom 11. The said groove is positioned to align with oil outlet orifice 25 thereby permitting the oil to drain from the groove into the hole 25 and thence to flow back into the engine (not shown). The spindle 15 is machined with an interior, cylindrical opening 30. An interior thread 31 which is tapped in opening 30 furnishes means of attachment to threadedly receive the threaded end 32 of the rod 16.

Referring now to FIG. 2, it will be seen that a pair of integral, perpendicular ribs 33, 34 reinforce the bottom 11. One rib 34 provides the necessary support for inlet and outlet orifices 23, 25 and their respective tube connecting bosses 26, 27. The second rib 33 terminates outwardly in a pair of opposed, depending, mounting legs 35, 36 to permit securing the oil cleaner in place in the vicinity of the motor (not shown) using the necessary brackets, bolts, nuts, etc. as required for a sturdy installation. Holes 48 and adjusting slots 49 are provided in mounting legs 35, 36 for this purpose.

As seen in FIGS. 3, 5, the support tube 17 is fabricated from a hollow, cylindrical tube, preferably of aluminum, which terminates upwardly in an open, unobstructed end 50 to permit unimpeded passage of the untreated lubricating oil introduced through inlet orifice 23. The bottom end 43 of tube 17 crimps inwardly upon cartridge support plate 41 forming a unitary, cartridge carrying structure. The plate 41 may be stamped from sheet aluminum of adequate strength to hold the cleaner cartridge 22 without deformation and has outer periphery 53 of circular configuration sized to easily fit within the main body cylindrical cavity 14. Spaced drainage holes 40 penetrate the plate 41 in vertical alignment over the groove 29 thereby permitting the passage of treated oil through the plate into the groove. One or more circular screens 42 provided with concentric center opening 51 slide down upon support tube 17 and rest upon the top of plate 41. The screens may be fabricated of standard aluminum screening and act to assure that holes 40 and consequently groove 29 remain free and clear of particles that may clog the oil passages. A concentric trough 44, which is machined into the interior surface 28 of the bottom 11, receives the plate holding lip 52 at bottom of support tube 17. The entrance of lip 52 into the trough 44 serves to secure the tube 17 into its desired concentric alignment within the main body 10.

Referring now to FIGS. 1 and 3, it will be seen that the top 12 is milled to provide an annular, vertical groove 54 of diameter to fit upon and seal the top edge 55 of the main body 10. A circular gasket 37 fabricated from Neoprene or other suitable gasket material rests within the groove 54 to provide a tight seal upon top edge 55 in the usual way when the cover 12 is tightened to the body 10. Reinforcing ribs 38, 39 cross perpendicularly at top of cover plate 12 to provide a solid closure capable of withstanding great pressures without leakage. The ribs 38, 39 intersect in a centrally positioned opening 56 through cover plate 12 to permit passage of the connecting rod 16. The space between rod 16 and opening 56 may be gasketed as required for a tight seal. The knob 57 may be secured to the top end 58 of rod 16 by a pin 59 and a horizontal passage 60 drilled through both the knob 57 and the top 58 of the rod 16 receives the turning handle 45 in a force fit.

As seen in FIGS. 1 and 3, when the top 12 is properly positioned to seal against the main body 10, the bottom surface 62 impresses upon and seals against the outer periphery of the cleaning cartridge top 63 thereby preventing untreated oil from flowing in the space 64 between the cartridge 22 and the inner wall 19 of the main body after the cartridge has been properly positioned. A plurality of radially extending oil passages 65 may be milled or cast into the under surface 66 of the cover plate 12 to form a plurality of oil conduits from the support tube interior channel 24 over the top 63 of the cartridge 22. It will thus be seen that untreated oil enters the oil cleaner through inlet orifice 23 and flows upward through the channel 24 formed by the hollow support tube 17 under the pressure supplied by the engine oil pump (not shown). The untreated oil then strikes the under surface 66 of top cover 12 and flows radially through passages 65 until stopped by the seal of bottom surface 62 upon the top 63 of the cartridge 22. The oil then flows downwardly through the filter element to permit complete cleaning activity to occur. The treated oil then leaves the cartridge 22 and passes through holes 40 in plate 41 into the oil groove 29 which conveys it to the oil outlet orifice 25.

In order to use the instant invention, all that is required is to mount the unit adjacent to the engine in any secure, well-known manner utilizing the mounting brackets 35, 36 provided for that purpose. The lubricating oil line (not shown) should then be severed and properly connected to the oil inlet and outlet orifices 23, 25 at the respective bosses 26, 27. Once the unit is secured and connected in place, one or more screens 42 should be inserted over tube 17 to rest upon plate 41. The filter element 22 may then be installed upon the tube 17 until it contacts screen 42. The entire filter assembly should then be inserted into the interior 14 of the main body 10 through the top opening 20. The tube should be positioned with the bottom lip 52 applied within the trough 44 and then the cover 12 attached to close the main body 10. The rod 16 is inserted through cover opening 56 until threads 32 engage spindle threads 31. The handle 45 may then be turned until gasket 37 compresses between the top edge 55 of the body 10 and the cover groove 54 to assure a pressure tight connection.

In order to replace the filter cartridge 22, all that is required is to turn handle 45 until the mating threads 31, 32 disengage. The cover plate can then be removed thus exposing the interior contents of main body 10. The support tube 17 can then be grasped by the fingers near its open end 50 and the tube 17, its attached plate 41 and the filter cartridge 22 can be carefully removed without undue soil or inconvenience. The cartridge 22 may then be removed and discarded and a new cartridge inserted on the tube 17. By reversing these steps, the oil cleaner may be speedily reassembled and the new cartridge can then be placed in position for operation.

Although we have described our invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:
1. In an oil cleaner, the combination of a generally cylindrical hollow main body,
    said body having a closed bottom and an open top,
        said bottom being milled to provide a pair of concentric grooves;
    an axially aligned interior threaded spindle,
        said spindle rising from said bottom inside of the said grooves,
        said spindle having a relatively small diameter in comparison with the diameter of the said main body;
    a hollow, cylindrical support tube removably resting upon the body bottom,
        the said tube removably covering the threaded spindle,
        and a portion of the tube standing within the innermost of said concentric grooves;
    a circular plate carried by the bottom of the support tube,
        said plate being provided with a plurality of holes, each of said holes overlying a portion of the outermost of said concentric grooves; a screen carried by the said plate, said screen having a diameter slightly less than the diameter of the said plate;
    an oil cleaning cartridge surrounding the support tube and contained within the main body,
        the said cartridge having its bottom in contact with the screen;
    a gasketed top cover closing and sealing the said open top of the main body,
        the cover being secured in place by a rod threadedly engaged within said spindle,
        and a portion of said cover contacting said cartridge;
    oil inlet means provided in the bottom of the main body;
    oil outlet means provided in the bottom of the main body;
    and oil passage means provided within the main body whereby untreated oil may flow into the bottom of the main body, and the cleaned oil flows out of the oil outlet in the bottom of the main body.
2. The invention of claim 1 wherein said oil passage means include a plurality of radial grooves provided in the bottom of said cover, said grooves extending over the entire width of said cartridge, and said grooves conveying oil over the top of the said cartridge.

3. The invention of claim 1 wherein said oil passage means include the oil conduit formed by the interior of said support tube from said oil inlet means to said top cover and oil passages machined into said cover, said oil passages including a plurality of radial grooves provided in the bottom of said cover, said grooves extending over the entire width of said cartridge, and said grooves conveying oil over the top of the said cartridge.

References Cited

UNITED STATES PATENTS

| 2,547,857 | 4/1951 | Cook | 210—439 |
| 2,661,846 | 12/1953 | Lash et al. | 210—494 X |
| 2,895,615 | 7/1959 | Oathout | 210—494 X |

REUBEN FRIEDMAN, *Primary Examiner.*

F. MEDLEY, *Assistant Examiner.*